Patented Oct. 6, 1953

2,654,767

UNITED STATES PATENT OFFICE 2,654,767

PROCESS OF ALCOHOLYSIS

James V. Hunn, Avon Lake, Ohio, assignor to The Sherwin-Williams Company, Cleveland, Ohio, a corporation of Ohio No Drawing. Application March 18, 1950, Serial No. 150,555

21 Claims. (Cl. 260—410.9)

This invention relates to a new method of producing lower alkyl esters from high molecular weight fatty acid esters of polyhydric alcohols, particularly glycerol esters, using the addition product of certain alkaline earth metal compounds with glycerine as a catalyst material at relatively low reaction temperatures. More particularly, this invention relates to the production of methyl esters of fatty acids from glyceride oils at relatively low temperatures of reaction utilizing the addition products of calcium oxide, calcium hydroxide, and strontium monoxide with glycerine in catalytic amounts.

Lower alkyl esters of high molecular weight fatty acids are of considerable importance as intermediate compounds in the manufacture of certain drying compounds useful as vehicles in coating compositions. The synthesis of such lower alkyl esters from lower alkyl alcohols and fatty acids by ordinary processes of esterification is not commercially feasible, due in large measure to cost of raw materials and the low yields obtainable, and the demand for such esters has been supplied largely by alcoholizing various glycerides of high molecular weight fatty acids occurring naturally. Alcoholysis, as such, is a well known process, and numerous catalytic materials have been developed for improving the conversions.

After an extended investigation of alcoholysis procedures and catalysts, it has been found that any material which would, in an anhydrous system of alcohol and glyceride oil, produce and maintain throughout the reaction a condition of alkalinity to phenolphthalein, would promote the alcoholysis reaction. Numerous possible catalyst materials were tested and it was found that only those oxides and hydroxides of metals in the alkali and alkaline earth groups were capable of promoting the reaction at an appreciable rate. It was further found that only those oxides and hydroxides in these groups that had an appreciable solubility in the anhydrous alcohol would operate as catalysts. For this reason, strontium oxide, calcium oxide, and calcium hydroxide were found to be inoperative as catalytic materials.

Barium oxide, barium hydroxide and strontium hydroxide were found to be particularly useful, as such, as catalysts for the production of the lower alkyl esters of higher molecular weight fatty acids from glyceride oils. The process involving the use of these materials is disclosed in detail and claimed in my copending application Ser. No. 124,900, filed November 1, 1949, now abandoned. It should be pointed out that the herein described invention is different from that described in the aforementioned copending application and that a study of said application is not necessary to a full and complete understanding of the present invention, all pertinent subject matter of that application having been reproduced herein.

The alkaline earth metal oxide and hydroxide catalysts which have been found useful in the preparation of low molecular weight monohydric alcohol esters of fatty acids derived from polyhydric alcohol esters, such as glyceride oils, have the disadvantage of being somewhat more expensive than those oxides and hydroxides mentioned above as being inoperative as catalytic materials. Thus, for economic reasons in large scale operations as well as certain other advantages which will appear hereinafter, it would be desirable to be able to use strontium oxide, calcium oxide or calcium hydroxide as a catalytic material in the production of low molecular weight esters of high molecular weight fatty acids from polyhydric alcohol esters, such as animal and vegetable glycerides.

It is, therefore, a principal object of my invention to provide a method of producing such useful esters utilizing heretofore inoperative alkaline earth oxides and hydroxides as catalytic materials in a low temperature alcoholysis process.

As indicated, I have found upon repeated laboratory runs that low temperature alcoholysis reaction will not take place except under circumstances where the reaction mass is maintained alkaline to phenolphthalein. It is a primary object of this invention to provide a process of alcoholysis using otherwise inoperative catalyst materials, which process is characterized in that it is carried out at relatively low temperatures and under conditions of alkalinity to phenolphthalein which can be secured only so long as the catalyst is not converted to soap, or neutral complex, so rapidly as to become ineffective in the process. At temperatures of 200° to 250° C., this conversion to neutral products is rapid and, therefore, the active catalyst that promotes the alcoholysis at these temperatures is the metal soap or other neutral complex. The alcoholysis reaction using the lower alkyl alcohols cannot be carried out at these high temperatures without the use of extremely high pressures due to the vapor pressure of the alcohol. These soaps or complexes that are formed at the high temperature will not act as catalysts at the low temperatures employed herein.

Other objects of my invention will appear as the description proceeds.

To the accomplishment of the foregoing and related ends, said invention, then, consists of the means hereinafter fully described and particularly pointed out in the appended claims, the following description setting forth in detail certain embodiments of the invention, such disclosed means constituting, however, but a few of the various forms in which the principle of my invention may be employed.

Broadly stated my invention is in the provision of a process for producing low molecular weight monohydric alcohol esters of high molecular weight fatty acids from glyceride oils, comprising the steps of reacting said glyceride oil with a molar excess of a monohydric alcohol of from 1 to 3 carbon atoms in the presence of from about 0.2% to about 1% (based on the oil of the earth compound) by weight of the oil of the glycerine addition product of an alkaline earth base, which may be selected from the group consisting of the oxides and hydroxides of calcium, barium, and strontium for a period of from about 10 minutes to about 6 hours at a temperature less than 150° C. In a preferred embodiment of my invention, the process is completed by neutralizing the excess alkalinity of the catalyst material with an acidic material, preferably a non-mineral acidic material and removing the unreacted alcohol and by-product glycerine from the reaction mass. Mineral acids, such as $H_3PO_4$, $H_2SO_4$, and HCl, may be used if desired. These mineral acids are of the non-oxidizing type.

I have found that strontium monoxide, calcium oxide, calcium hydroxide can be treated so as to produce and maintain in the presence of anhydrous alcohol alkalinity to phenolphthalein and thereby promote the alcoholysis reaction. This is effected by reacting such oxides and hydroxide with glycerine to form the addition compounds, sometimes referred to as "glyceroxides." It should be borne in mind that these so-called reaction products are not alcoholates, i. e., of the formula M—O—R wherein M is a metal and R is an aliphatic radical. The true structure of these addition products is not known, but for reference purposes only, these addition products shall be referred to in the ensuing disclosure and the appended claims as "glyceroxides."

These glyceroxides have greatly increased solubility in alcohols without loss of alkalinity, up to temperatures of about 150° C. where they undergo too rapid conversion to neutral compounds possibly by reaction with the oil. Glycerine addition products of lead oxide, magnesium oxide, magnesium hydroxide, zinc oxide, zinc hydroxide, aluminum oxide, aluminum hydroxide, strontium dioxide and barium dioxide, as well as the addition of glycerine products of strontium monoxide, calcium oxide and calcium hydroxide were made and tested in the investigation. The first group were found not to promote the alcoholysis reaction at any measurable rate, because of insufficient solubility or instability with consequent rapid formation of neutral soaps, whereas the latter group were found to be highly effective alcoholysis catalysts. Barium oxide, barium hydroxide and strontium hydroxide, per se, have sufficient solubility in anhydrous alcohol to be operative of themselves. These compounds may be reacted, however, with glycerine to give the corresponding glyceroxides and used in accordance with their invention. There is little point in this, however, due to their utility per se.

By the term "alkalinity to phenolphthalein" as used herein and in the appended claims, I mean that a pink color will appear on the addition of phenolphthalein to a sample of the alcohol layer. When the reactants are mixed, there will be two layers, one rich in alcohol and the other rich in oil. The alcohol rich layer must show a pink color on addition of phenolphthalein to a sample thereof. As the reaction proceeds, and reaction products form, there will be, for the most part of the reaction period, at least two phases. As glycerine forms, some alcohol is in solution with the glycerine, and the balance in solution with the alcoholized ester and unreacted oil. The glycerine layer should be alkaline to phenolphthalein. There is often observed in the course of these reactions a brief period when the reaction mass is homogeneous; the equilibrium is rapidly upset by further reaction and two phases again appear.

These glycerine addition products may be prepared in four different ways:

1. By mixing equal molar quantities of the metal oxide or hydroxide and 98% glycerine, continuing the agitation until solidification takes place, and grinding the product to a powder;

2. By mixing equal mols of the metal oxide or hydroxide and 98% glycerine, slowly adding alcohol, such as methyl alcohol, as the reaction progresses to produce a thick paste or slurry;

3. By the gradual addition of the metal oxide or hydroxide to an excess of 98% glycerine, stirring continuously and stopping the addition of the metal compound when approximately 1 mol has been added to 5 mols of glycerine so as to produce a smooth paste;

4. By preparation of the catalyst in the process by adding to the reaction vessel ½ mol of the metal compound, 10 mols of 98% glycerine, 190 mols of alcohol and 21 mols of glyceride oil.

Specific examples of the preparation of the catalyst material for use in accordance with this invention are as follows: Note should be made of the fact that the quantities of glycerine given are adjusted for 98% concentration. It is clear that like adjustments may be made for glycerine products of different concentrations. Commercial glycerine ordinarily ranges from about 95% to about 98% concentration and is useful in that range in this invention. With lower concentrations, the amount of water being introduced into the reaction has considerable importance as will be pointed out hereinafter. At too low concentrations, less than about 90%, the addition product is unsatisfactory.

EXAMPLE I (CALCIUM GLYCEROXIDE)

In accordance with method 1 given above, 28 grams of calcium oxide (CaO) were mixed into 46.9 grams of glycerine and stirred until solidification occurred. The resulting mass was pulverized and may be used directly.

EXAMPLE II (STRONTIUM GLYCEROXIDE)

In accordance with method 3 given above, 103.6 grams of strontium monoxide (SrO) were added gradually to 470 grams of glycerine with continuous stirring. The resulting paste is useful in the process herein described.

EXAMPLE III (CALCIUM GLYCEROXIDE)

In accordance with method 3 given above, 56.1 grams of calcium oxide (CaO) were added gradually to 470 grams of glycerine with continuous stirring. The resulting paste is useful in the process herein described.

EXAMPLE IV (CALCIUM GLYCEROXIDE)

In accordance with method 2 given above, 74.1 grams of calcium hydroxide ($Ca(OH)_2$) were added to 94 grams of glycerine, while slowly adding methyl alcohol in the course of the reaction to produce a thick paste. The reaction mass was agitated during the reaction. This paste is useful in the process herein described.

EXAMPLE V (BARIUM GLYCEROXIDE)

In accordance with method 3 above, 176 grams of barium oxide (87% pure) were added gradually to 470 grams of glycerine with continuous stirring. The resulting paste is useful in the process herein described.

In like manner, the glyceroxide catalysts of barium hydroxide and strontium hydroxide may be made and used in this process. However, there is no economic advantage to be gained thereby since the untreated barium oxide, barium hydroxide and strontium hydroxide work well as such. It should be borne in mind, nevertheless, that although such materials are useful per se, they are also useful as the glycerine addition product catalysts and operative in accordance with the principles of this invention.

*The use of the catalyst*

Catalytic materials prepared in the manners outlined above were used to produce methyl esters of soya fatty acids by reacting 9 mols of methyl alcohol (3 times theory) with 1 mol of soya oil (average molecular weight calculated as 878) at reflux temperatures, that is about 160° F. at atmospheric pressure. The strontium oxide (SrO), calcium oxide and calcium hydroxide, glycerine adducts were found to be roughly equivalent on a molar basis. In the case of the calcium oxide-glycerine adduct, 0.2% (on the calcium oxide content) by weight of the oil used, was found to be sufficient to give a conversion in excess of 94% in 4 hours or less at reflux temperatures. Whether the catalyst was prepared by methods 1, 2 or 3, they were found in each case to be practically equivalent with respect to reaction rate. Catalysts produced by method 4 were found to be slower in reaction rate, possibly due to slower formation of the glycerine adduct in the alcohol diluted solution. However, the same degree of conversion could be obtained by allowing about twice the reaction time, i. e., about 8 hours.

As is well known, the alcoholysis reaction to produce monohydric low molecular weight alcohol esters and glycerine from monohydric alcohols and glyceride oils is a reversible reaction. By the law of mass action it would appear inadvisable to add glycerine to a reaction where it is one of the desired products, as by the law of mass action, it would be expected to upset the equilibrium so that lower conversions to monohydric alcohol esters would be obtained. I have found, however, that the quantities used for the preparation of the catalyst has no appreciable influence on the final equilibrium established. Accordingly, while in the 4 methods listed above equal molar quantities of the metal oxide or hydroxide and glycerine are indicated, it should be borne in mind that even substantial excesses in the amount of ½ to 10 mols or more of glycerine may be used without appreciable influence on the final equilibrium established.

It has been found that in a methanolysis reaction, where 3 times the theoretical amount of methyl alcohol is employed, equilibrium will be established at about 95% conversion to methyl esters. At this degree of conversion, as will be more particularly pointed out hereinafter, the excess methyl alcohol will be approximately equally distributed between the methyl ester and glycerine layers. Thus, the glycerine layer will contain about ½ of the excess methyl alcohol, and in actual experience contains about 50% alcohol.

In one example, the entire glycerine and alcohol layer from a methanolysis batch was taken, and calcium glyceroxide prepared according to method 3 was added to it to the extent of about .2% (on the calcium oxide content) based on the oil used. To this mixture was added the same amount of soya bean oil used in the preceding batch, and twice the theoretical quantity of methyl alcohol. The quantity of the methyl alcohol was reduced in this case because one theoretical quantity was contained in the glycerine layer from the preceding batch. The reaction was allowed to proceed for a period of about 4 hours at reflux temperature (about 160° F.). Equilibrium was established in this case at 88% conversion to methyl ester. This was a drop of only 6% to 7% in spite of the fact that about twice the amount of glycerine was present at equilibrium.

Previous experience has shown that as the amount of water present in the reaction mass increases, the conversion at equilibrium decreases. This previous work has also shown that water entering the reaction in the alcohol and oil is mostly concentrated in the glycerine layer. Therefore, the second batch, containing the entire glycerine layer from the first batch, had nearly twice the amount of water present. It is believed that this factor contributed most to the lowering of the conversion in the second batch and that, therefore, the influence of the glycerine in promoting reversion can be further depreciated. The alkaline earth metal oxides and hydroxides which have been found catalytically useful in accordance with this invention react very slowly with oils to form soaps, thereby making it possible to carry out the reaction in one step, whereas the latest improvements in the process using alkali metal hydroxides, such as sodium hydroxide, have recommended a step-wise addition of the catalyst. The catalysts of this invention may be added to the total reaction mass in one operation. The soaps formed at the end of the reaction on neutralizing the excess catalyst material with fatty acids, are more soluble in the lower alkyl esters such as methyl esters than even the barium soaps produced in accordance with the teachings of my prior application. Alkali metal soaps have the reverse solubility characteristics, being more soluble in the glycerine layer than in the ester layer, making difficult the recovery of glycerine and also increasing the solubility of the ester layer in the glycerine layer rendering separation difficult. The excess of glyceroxide catalyst not converted to soap or complex during the reaction may be neutralized by the addition of a non-mineral acidic material, e. g. an organic acid such as a high molecular weight fatty acid, oxalic acid, or $CO_2$, converting the calcium or strontium to soap, or to the oxalate, or to the carbonate. Mineral acids are, therefore, unnecessary, thereby eliminating corrosion of equipment and contamination of the glycerine with inorganic salts. The excess of alcohol may be recovered from the combined glycerine and ester layers by distillation even in the presence of the alkaline earth metal soap without causing reversion of the ester to the glyceride or polyhydric alcohol ester. Formerly, sodium soaps had to be removed in order to obtain efficient separation of the glycerine and ester layers either before or after removal of the alcohol. Any alkaline earth soaps present in the ester layer do not have to be removed because they do not interfere with the separation, or cause gellation at the time the methyl ester is subsequently converted to the pentaerythritol ester, such as is often desirable.

In the preparation of the pentaerythritol esters from the monohydric alcohol esters produced in my improved process, lead oxide or litharge is commonly used as a catalyst. The presence of the alkaline earth soaps in this product has been found most unexpectedly to stabilize the lead soaps formed in the pentaerythritol conversion and prevent their precipitation upon standing. Otherwise, there is no apparent deleterious effect attributable to these soaps when the product is used as a paint vehicle in the ordinary manner.

A further advantage in the use of the catalysts of this invention is that the alcohol, recovered for reuse from this process, has a lower water content than when an alkali metal hydroxide is used as catalyst because the alkaline earth oxides, particularly in converting to soap during the reaction, produce only ½ as much water as sodium hydroxide or the like. Moreover, by using fatty acid or oxalic acid, or $CO_2$, for neutralization, no water of dilution is introduced as in the case of mineral acids such as phosphoric acid (75%), the latter being the highest concentration that is practical to use.

The glycerine produced as a result of the employment of the process of this invention is of such purity that it is suitable for use in the manufacture of alkyds and various oil modified alkyds without further purification. Particular advantages of the calcium glyceroxide catalyst are that it is non-toxic, lower in cost, and the soaps formed at the end of the reaction being more soluble in the methyl ester than even the barium soaps disclosed in my previous application, and are thus more available to act as partial catalysts when and if the methyl ester is subsequently converted to the pentaerythritol ester.

It should be pointed out that in the neutralization of catalyst step, the glycerine used to make the catalyst is released and may be recovered when the calcium is converted to soaps.

It has been observed that in the course of the alcoholysis reaction that the catalyst is gradually used up, it being assumed that this loss was due to soap formation. In general, I so adjust the catalyst concentration as to have 10% of the original amount available at the end of the reaction. This is determined by titrating the end products with mineral or fatty acids to neutrality to phenolphthalein, as is well understood by those skilled in the art.

While the calcium or strontium glyceroxide used as the catalyst upon conversion to the fatty soap is more soluble in the methyl ester than corresponding barium soaps, it has been observed that these soaps formed during the reaction and upon neutralization did not have all of the solubility in the methyl ester that was to be expected or desired. It has been found, however, that if upon neutralization a slight excess of fatty acid is added, said excess being equivalent to the quantity theoretically required to form neutral soaps of the total catalyst less that amount of acid required to neutralize the unreacted catalyst, greatly improved solubility of the soaps in the methyl ester or ester layer is obtained. This latter fact has led to the belief that normal soaps are not formed during the course of the reaction, but whatever complexes are formed are first decomposed and then neutralized by the additional amount of acid.

It becomes convenient at this point to illustrate by specific example the mode in which the catalysts above described are employed in the process of my invention, whereby the improved results previously discussed are obtained. It is to be understood that these examples are for illustrative purposes only and are not to be construed as limiting the invention to the precise materials shown in such specific examples. For example, while I have limited my examples to reaction obtained with the catalysts of this invention on soya bean oil, and linseed oil, it is to be understood that this is an over-all reaction procedure applicable to other vegetable or animal glyceride oils from which it may be desired to produce methyl esters either as intermediates in the production of vehicles for paints, or in the production of soap. This process is essentially an alcoholysis process which has been improved by the step of employing as the catalytic material an addition product of strontium monoxide, calcium oxide, or calcium hydroxide to glycerine as the catalyst in a low temperature process. Accordingly, it is believed that those skilled in the art will immediately recognize the applicability of this process to such other glyceride oils or polyhydric alcohol esters of high molecular weight fatty acids as linseed oil, menhaden oil, safflower oil, China-wood oil, castor oil, dehydrated castor oil, cottonseed oil, palm oil, coconut oil, oiticica oil, and the like. The high molecular weight fatty acids embraced by these oils ordinarily contain from about 9 to 30 carbon atoms.

EXAMPLE VI

Calcium glyceroxide was prepared according to Example III above and 72.5 grams of the resultant catalyst solution were added to 878 grams of alkali refined soya bean oil having an acid value of 0.3. 9 mols of methyl alcohol (288 grams) were added and the mixture heated to reflux (160° F.) and maintained at reflux temperature for a period of four hours.

After the methanolysis, sufficient soya bean oil fatty acids were added to neutralize the excess alkalinity of the catalyst. The layers were then separated and the excess methyl alcohol recovered by distillation. The alcohol-free ester layer was then vacuum distilled at pressure of 5 mm. Hg and 94% of this layer was recovered as the methyl ester. This percent recovery is a measure of the percent conversion.

EXAMPLE VII

Strontium glyceroxide was prepared according to Example II above and 24.4 grams of the resultant catalyst solution were added to 878 grams of degummed soya bean oil having an acid value of 1.0. 9 mols of methyl alcohol (288 grams) were added, and the mixture heated to reflux (about 160° F.) and maintained at reflux for a period of four hours.

After the methanolysis, sufficient soya bean oil fatty acids were added to neutralize the access alkalinity of the catalyst. The layers were then separated, and the excess methyl alcohol recovered. The alcohol-free ester layer was then vacuum distilled and 97% of this layer was recovered as methyl ester.

EXAMPLE VIII

Calcium glyceroxide was prepared according to Example III above and 72.5 grams of the resultant catalyst solution were added to 878 grams of alkali refined linseed oil having an acid value of 0.3. 9 mols of methyl alcohol were added, and the mixture heated to reflux (about 160° F.) and maintained at reflux for a period of four hours.

After methanolysis, sufficient linseed oil fatty acids were added to neutralize the excess alkalinity of the catalyst. The layers were then separated and the excess methyl alcohol recovered by distillation. The alcohol-free ester layer was then vacuum distilled at 5 mm. Hg and 93.5% of this layer was recovered as methyl ester.

EXAMPLE IX

Calcium glyceroxide was prepared according to Example I above and 20.8 grams of the resultant catalyst powder were added to 878 grams of alkali refined soya bean oil having an acid value of 0.3. 6 mols of ethyl alcohol were added and the mixture heated to reflux about 190° F. and maintained at reflux for a period of 5 hours.

After the ethanolysis, sufficient soya bean oil fatty acids were added to neutralize the excess alkalinity of the catalyst. The layers were then separated and the excess methyl alcohol recovered. The alcohol-free ester layer was then vacuum distilled and 95% of this layer was recovered as ethyl ester.

EXAMPLE X

Calcium glyceroxide was prepared according to Example III above and 72.5 grams of the resultant catalyst solution were added to 878 grams of alkali refined soya bean oil having an acid value of 0.3. 10 mols of methyl alcohol (320 grams) were added and the mixture heated to 125° F. and agitated for a period of 6 hours.

After the methanolysis, sufficient soya bean oil fatty acids were added to neutralize the excess alkalinity of the catalyst. The layers were then separated and the excess methyl alcohol recovered by distillation. The alcohol-free ester layer was then vacuum distilled at a pressure of 5 mm. Hg and 92% of this layer was recovered as the methyl ester.

It will be noted that the procedure to be followed in the foregoing examples is relatively simple, and the variations that can be made therewith without substantially departing from the spirit of this invention will become readily apparent to those skilled in the art. Accordingly, it is believed unnecessary to unduly extend the specification by giving further examples of other glyceroxides which have been alcoholized with a variety of alcohols under a variety of conditions since such examples would be substantial duplicates with those given above.

The temperature at which the reaction is most usually carried out ranges from reflux temperature at the pressure employed, usually atmospheric, down to about 100° F. where the time of reaction becomes unduly long under ordinary conditions of temperature and agitation. The best results are obtained in the range of from 125° F. to about 190° F. most desirably from 150° to 170° F. for a period of time ranging from as low as 10 minutes up to 8 hours, dependent upon the degree of agitation and the temperature. The range 150°–170° F. frequently represents the variation which may occur in a single run and is expressed in the examples as about 160° F. Temperatures over 150° C. (302° F.) will tend to decompose the catalyst. Usually the reaction is complete, i. e. equilibrium is reached in about 4 hours at an average temperature of 160° F. where conversions are in the range of about 90% to 97%. Extremely rapid reaction times of about 10 to 20 minutes may be secured by utilizing machines capable of extreme agitation, such as the well known Waring Blendor even at room temperature. Thus, the temperature range over which the catalysts of this invention are effective is from room temperature (about 70° F.) to about 190° F. As previously indicated, I may use the catalyst in amounts ranging from 0.2% to 1% by weight of the oil, although for best results I employ from .4% to .7% by weight of catalyst based on the weight of oxide or hydroxide used in forming the glyceride catalyst. The period of time is dependent as much upon agitation as it is upon temperature, and the better the agitation, the shorter the time required to reach equilibrium.

With respect to the alcoholysis reaction rate apart from all other considerations, it has been found that it is not of critical importance what alkaline metal ion is employed. The reaction rate is most sensitive to the available alkalinity. Thus a material which is insoluble in the alcohol-rich layer furnishes no alkalinity to the mass, and a material which is instable or reacts rapidly to produce soaps even at these relatively mild reaction conditions will likewise fail.

While methyl alcohol has been used as the interchange radical providing material, in general, another monohydric alcohol, e. g. ethyl alcohol, or propyl alcohol in amounts substantially in excess of the oil on a molar basis ranging from about 1.5 to about 4 times the theoretical amount of alcohol required may be employed. Theoretically, with a pure triglyceride 3 mols of alcohol are required to effect the alcoholysis. The more nearly the amount of alcohol approaches theory in this alcoholysis reaction, the lower the extent of conversion. As the amount of alcohol is increased, the conversion to ester product increases up to amounts of alcohol equivalent to about 3 times theory, and thereafter with increasing amounts of alcohol greater difficulty in clean separation of the ester layer and the glycerine layer occurs, if the separations are to be made prior to removal of the excess alcohol. The ester layer in the presence of the calcium is capable of taking up about 10% of its weight of alcohol, or about 50% of the total excess alcohol under preferred operating conditions. As previously indicated, in ordinary operation, that is with an amount of alcohol equivalent to about 3 times theory, the glycerine layer is composed of about 50% alcohol. This distribution allows satisfactory separation, and on a weight basis there are very nearly equal amounts of alcohol in the two layers. If the excess of alcohol is increased, the concentration in the glycerine layer after reaction increases to the point where the specific gravity of the glycerine layer approaches the specific gravity of the ester layer (upper layer) and separation becomes more difficult. With still larger amounts of alcohol, i. e. up to 5 or more times the theoretical amount, the phases may be entirely reversed so that the glycerine-alcohol layer appears as the upper layer, and the desired ester layer is the lower layer. I prefer to use an amount of alcohol equivalent to about 3 times the theoretical, i. e., a molar ratio of about 9 mols of alcohol to 1 mol of oil. Of course, it will be understood that where glycerol esters of the incomplete ester type, i. e. mono-, and diglycerides, or mixtures thereof with the triglycerides are used, the theoretical amount will be somewhat less than 3 times theory for the triglyceride.

While glycerides have been most frequently exemplified in the foregoing disclosure, it is clear that this process is equally applicable to high molecular weight fatty acid esters of other polyhydric alcohols for example, ethylene glycol esters, pentaerythritol esters, propylene glycol esters, and the like, although it is realized that the commercial practicability of such operations renders the use of this process with such other esters improbable.

It is not necessary to use C. P. compounds in the preparation of the glyceroxide catalysts of this invention as it has been found that the commercial grade works equally well. As a matter of fact, the glycerine from a previous batch may be used in the preparation of the catalyst. It is, however, desirable to know the percent of available alkalinity and this may be determined by titration with standard hydrochloric acid solution to a phenolphthalein end point. The glyceroxide catalyst may be reduced with alcohol prior to addition to the reaction mass, although this has been found to be unnecessary when the catalyst is properly reduced in size either by solution, as for example, in glycerine, or grinding to provide the maximum surface available for catalytic action.

Neutralization of catalyst

The soaps formed in the course of the reaction, and upon neutralization, may be left in the final product or removed depending upon the final use of the product. To remove the catalyst, sufficient mineral acid, such as sulphuric or phosphoric, may be added to the reaction mass to form the phosphate or sulphate salts of the catalyst. These salts are insoluble in the ester and glycerine layers. When the alkali metal catalysts are used and the reaction mass is neutralized with mineral acids, the sodium sulphates, phosphates, etc. formed are soluble to a considerable extent in the glycerine layer and their removal is necessary in the recovery and refining of the glycerine. The calcium, barium, and strontium salts formed on neutralizing my catalysts with a mineral acid are essentially insoluble in the glycerine layer and may be removed by simple filtration.

When using sodium or any of the other alkali metal compounds, namely potassium and lithium hydroxides as the catalyst, it is necessary to neutralize not only the excess alkalinity at the end of the reaction, but it is also necessary to completely decompose the metal soaps formed into inorganic metal salts and free fatty acids. It is necessary to remove the alkali metal soaps, not because they promote reversion to glycerine esters on distillation of the excess alcohol from the mixture of glycerine and ester, but because they are soluble in the glycerine and prevent complete separation of glycerine and the ester. In the presence of sodium soaps, there is an appreciable solubility of the ester in the glycerine which may range from 5% to 20% of the total ester depending upon the amount of catalyst used. The calcium and strontium soaps resulting in the process according to this invention are insoluble in glycerine and quite soluble in the ester layer. Therefore, they do not interfere in the complete and efficient separation of the glycerine and ester layers. For the reasons given above, the excess glyceroxide catalyst can be neutralized by the addition of fatty acids, thereby converting all of the calcium or strontium present to neutral compounds.

After the excess of glyceroxide catalyst has been neutralized with fatty acids, the excess alcohol can be distilled off the reaction mass prior to separation. Where distillation of the alcohol is attempted prior to neutralization and separation, reversion to the glyceride will occur with increasing rapidity as the concentration of alcohol is diminished below that point where mass action favors formation of the desired ester. With the alkali metal catalyst, even if separation is done before distillation, but without neutralization, the situation is worse than with the catalysts of this invention because of the increased solubility of the ester in the glycerine layer caused by the alkali soaps.

It should be pointed out, however, that with the glyceroxide catalysts of this invention, it is possible to secure a complete and satisfactory separation of the layers prior to neutralization since the calcium and strontium soaps are soluble in the ester layer, insoluble in the glycerine layer, and accordingly do not act as emulsifiers. These soaps are to be distinguished from the soaps formed upon neutralization with fatty acids in that these soaps, or possible complex addition products, are formed in the course of the alcoholysis reaction. Following such separation, the layers may be separately neutralized and the alcohol recovered; or in the absence of the glycerine layer, the alcohol may be removed from the ester layer without neutralization first without causing reversion because no glycerine is present.

The still residue of glycerine and ester, with the calcium or strontium soap dissolved in the ester layer, readily separates into two layers, and as no mineral acids have been introduced and no salts formed, the glycerine layer is clear and brilliant. Only a very small percentage of the total calcium or strontium used will be found in the glycerine layer in the form of a complex which is not yet known. The ester layer when hot and directly from the still contains the calcium or strontium soap in solution. On cooling, some of this soap may crystallize out, equilibrium being established in from 24 to 48 hours on standing at room temperature. If the layers are not separated, the calcium or strontium soap will settle to the bottom of the ester layer and remain. They do not settle into the glycerine layer, a sharp interface being maintained. The calcium or strontium soaps that do separate from the ester layer are readily filtered, resulting in a clear and brilliant ester product.

By using fatty acids to neutralize the excess of catalysts, a neutral ester may be produced if that is desired. However, it has been found that the best method of neutralization particularly when the product is to be converted subsequently to a polyhydric alcohol ester, such as pentareythritol, is to add fatty acid until both the glycerine and ester layers are neutral to phenolphthalein and then add a calculated excess to give the ester a theoretical acid value of about 0.5. A slight acidity of substantially this magnitude in the ester layer due to fatty acids seems to aid in the initiation of a subsequent reaction by which the pentaerythritol ester is produced. The crude ester of such low acidity, i. e., an acid number less than about 1, and containing no traces of mineral acid has a greater color stability when stored and does not pick up iron from the storage tanks. Esters made with alkali metal catalysts and neutralized with mineral acids will have acid values ranging from 2 to 5, and if stored in iron tanks for any appreciable length of time will darken in color.

I have found also that the excess glyceroxide catalyst can be removed by blowing the reaction mass with $CO_2$. This causes the formation of calcium or strontium carbonate which goes into the glycerine layer. Upon standing or reheating the glycerine layer, the resulting carbonate is precipitated out, although not completely. This method has the advantage of reducing the amount of calcium or strontium soap which may eventually appear in the ester layer upon neutralization with the fatty acid by about 10%. $CO_2$ will not, however, break up any calcium or strontium soap, or complex, as may be already formed in the course of the reaction. Of course, this type of neutralization requires no maximum limit on the amount of $CO_2$ used.

In using mineral acids, such as $H_2SO_4$ and $H_3PO_4$, exact quantities are desirable in order to avoid subsequent difficulties as mentioned above. As originally indicated, the oxalic acid treatment may be used and is much superior to the mineral acid treatment in that, here also, any excess of acid, which even if it remains in the ester layer, may be decomposed by heating the ester whereas mineral acids will not be so destroyed. The oxalic acid appears to break up the calcium or strontium soaps or complexes and produce a product which is substantially free of these elements. This is of importance in the field of soaps since impurities of this nature may be undesirable. Of course, if calcium oxide is used to form the glyceroxide catalyst, calcium oxide has the advantage in that it is non-toxic.

By the term "non-mineral acid" as used herein and in the appended claims, I mean to exclude such mineral acids as $H_2SO_4$, $H_3PO_4$, HCl, $HNO_3$, and the like, and to include $CO_2$, oxalic acid, and the fatty acids. I prefer, however, to use fatty acids of 9–30 carbon atoms, and particularly those derived from the oil being processed.

To produce a metal free ester layer, the reaction mass is first neutralized with a fatty acid, preferably a fatty acid derived from the same oil on which the alcoholysis was performed. The layers are then separated, and the ester layer treated with oxalic acid or mineral acid to precipitate the metal ion as the oxalate or as the salt of the mineral acid. The precipitate can be readily filtered yielding a metal-free ester layer.

It should be pointed out that oxalic acid may be used as the sole neutralizing agent, i. e. without going through the initial soap forming step. However, this is undesirable since in the presence of the glycerine layer, prior to separation, the calcium or strontium oxalate formed will go into the glycerine layer in such a form as to be nearly impossible to filter out. Moreover, the glycerine layer will be contaminated with calcium or strontium oxalate as well as other alkaline earth metal complexes. Recovery of glycerine of high purity contributes in no small measure to the economic feasibility of this process. If economy is not desired, then the latter method may be employed.

Specific examples of acids of 9 to 30 carbon atoms useful in neutralizing, and acidifying if desired, include: nonanoic, lauric, myristic, myristoleic, palmitoleic, oleic, palmitic, stearic, mellisic, gadoleic, cetoleic, erucic, selacholeic, delta-21,22 tricosenoic, linoleic, linolenic, elaeostearic, arachidonic, etc. Most of these acids are derived either as mixed acids or substantially pure acids from natural sources, such as animal and vegetable oils by well known processes. Such acids include soyabean oil acids, linseed oil acids, cottonseed oil acids, coconut oil acids, safflower oil acids, etc.

Water

Alcoholysis and ester interchange reactions in general take place only under essentially anhydrous conditions. It is, therefore, of basic importance that great care be exercised in controlling the water content of all raw materials entering into the process. Methyl alcohol, and ethyl alcohol to a lesser extent, is very hydroscopic and will pick up water rapidly when in contact with moist air. Water will normally enter the process from moisture in the oil and alcohol. It is also produced on neutralizing the original fatty acids in the oil, and upon neutralizing the excess catalyst with fatty acids. If the starting oil has a water content of 0.1% and an acid value of 1.08, and the alcohol used contains 0.14% water, the water in the final reaction mass arrived as follows:

| | Per cent |
|---|---|
| From the oil | 50.0 |
| From the alcohol | 22.5 |
| As water of neutralization | 27.5 |

From the above it can be seen that the moisture in the oil is the most important source of water, and it is desirable that the oil be dehydrated to the greatest extent possible.

After the excess alcohol is distilled from the glycerine and methyl ester mixture, the water present is found to be distributed between the recovered alcohol and the glycerine in substantially the following proportions:

In recovered alcohol, 82% of total water
In recovered glycerine, 18% of total water Thus it will be seen that most of the water from the reaction mass is being concentrated in the recovered alcohol and will, therefore, build up in the process on reuse of the recovered alcohol in subsequent batches. As the total water content of the reaction mass increases, conversions decrease. At a concentration of about 1% total water, based on the alcohol, the percent conversion starts to drop rapidly. It has been found that in order to maintain conversions of at least 93%, the total water content of the starting materials based on the alcohol present should not be greater than 1%. It is indicated, therefore, that to make complete reuse of the recovered alcohol, a certain amount of water must be removed from each batch in addition to that removed in the glycerine layer.

It appears further, that increases in moisture content require more catalyst. Maintaining alkalinity to phenolphthalein throughout the reaction will, however, automatically take care of this. It is usual practice to add about 10% more catalyst than would ordinarily be required, i. e. so that there is about 10% excess catalyst at the end of the reaction. Thus, contrary to usual practice with the alkali metal hydroxide catalysts, the catalysts of this invention may be added in one addition at the beginning of the reaction. Soap formation is so rapid with the alkali metal hydroxides that stepwise addition is required where soap formation cannot be tolerated.

Recovered alcohol

As previously indicated, if a conversion of 93% or higher is desired, the total water content of the starting batch should not be greater than 1% based on the alcohol. Experience has shown that the recovered alcohol contains about .83% water. If this alcohol is reused simply by adding sufficient fresh alcohol to replace that consumed in forming the ester, the water content of the starting blend would be:

|   | percent water |
|---|---|
| 4 parts of used alcohol | .83 |
| 3 parts of alcohol | .14 |
| 7 parts blend | .53 |

Blending in this proportion is done because of laboratory yields, 2:1 being theoretical.

This alcohol blend when mixed with an oil containing 0.1% water would give a total starting water content of 0.81% which is close to the upper limit that can be tolerated for a 93% or better conversion. The re-recovered alcohol in this case would contain 1.21% water. This is too high for further use.

If the re-use of the recovered alcohol is to be continued without rectification, water must be continually removed from the process in addition to that removed by the by-product glycerine.

Tests have shown that in the distillation of the excess alcohol from the glycerine and methyl ester, the normal alcohol-water vs. percentage distilled curve is not obtained. Evidently, the glycerine has a retentive effect on the water so that a high percentage of the alcohol can be recovered with low water content. By the use of this procedure, it should be possible to separate 70 to 80% of the recovered alcohol suitable for use and therefore make it necessary to rectify only 20% to 30% of the recovered alcohol.

Water in the oil

If the oil used in the alcoholysis contains even 0.1% moisture this will amount to 50% or better of all water in the final products. Therefore, the starting oil should be as nearly anhydrous as possible. A very effective method for removal of water from the oil has been found to be in the use of benzene. If 20% of benzene is added to the oil and removed by distillation, it carries over with it practically all of the moisture. Karl-Fisher titration shows less than 0.01% residual water in the oil. More or less benzene than that indicated above may be employed for this purpose, although 10 to 20% has been found to be satisfactory.

Other modes of applying the principle of this invention may be employed instead of those specifically set forth above, changes being made as regards the details herein disclosed, provided the elements set forth in any of the following claims, or the equivalent of such be employed.

I, therefore, particularly point out and distinctly claim as my invention:

1. A process for producing low molecular weight monohydric alcohol esters of high molecular weight fatty acids from glyceride oils, which comprises the step of reacting said glyceride oil with a molar excess of a monohydric alcohol of from 1 to 3 carbon atoms in the presence of from about 0.2% to about 1% (based on the weight of the alkaline earth base) by weight of the oil of the glycerine addition product of an alkaline earth base selected from the group consisting of calcium oxide, calcium hydroxide and strontium oxide for a period of time of from about 10 minutes to about 8 hours at a temperature less than 300° F.

2. A process for producing low molecular weight monohydric alcohol esters of high molecular weight fatty acids from glyceride oils, which comprises the steps of reacting said glyceride oil with a molar excess of a monohydric alcohol of from 1 to 3 carbon atoms in the presence of from about 0.2% to about 1% (based on the weight of the alkaline earth base) by weight of the oil of the glycerine addition product of an alkaline earth base selected from the group consisting of calcium oxide, calcium hydroxide and strontium oxide for a period of time of from about 10 minutes to about 8 hours at a temperature less than 300° F., neutralizing the excess alkalinity of the catalyst, and removing the unreacted alcohol and by-product glycerine from the reaction mass.

3. A process for producing low molecular weight monohydric alcohol esters of high molecular weight fatty acids from glyceride oils, which comprises the steps of reacting said glyceride oil with a molar excess of a monohydric alcohol of from 1 to 3 carbon atoms in the presence of from about 0.2% to about 1% (based on the weight of the alkaline earth base) by weight of the oil of the glycerine addition product of an alkaline earth base selected from the group consisting of calcium oxide, calcium hydroxide and strontium oxide for a period of time of from 10 minutes to about 8 hours with agitation at reflux temperature.

4. A process for producing low molecular weight monohydric alcohol esters of high molecular weight fatty acids from glyceride oils, which comprises the steps of reacting said glyceride oil with a molar excess of a monohydric alcohol of from 1 to 3 carbon atoms in the presence of from about 0.2% to about 1% (based on the weight of the alkaline earth base) by weight of the oil of the glycerine addition product of an alkaline earth base selected from the group consisting of the monoxide and hydroxide of calcium for a period of time of from about 10 minutes to about 8 hours at a temperature less than 300° F.

5. A process for producing low molecular weight monohydric alcohol esters of high molecular weight fatty acids from glyceride oils, which comprises the steps of reacting said glyceride oil with a molar excess of a monohydric alcohol of from 1 to 3 carbon atoms in the presence of from about 0.2% to about 1% (based on the weight of the alkaline earth base) by weight of the oil of the glycerine addition product of the monoxide of strontium for a period of time from about 10 minutes to about 8 hours at a temperature less than 300° F.

6. A process in accordance with claim 2 in which the catalyst is the addition product of equimolar amounts of calcium oxide and glycerine.

7. A process in accordance with claim 2 in which the catalyst is the addition product of equimolar amounts of strontium monoxide and glycerine.

8. A process in accordance with claim 2 in which the catalyst is the addition product of equimolar amounts of calcium hydroxide and glycerine.

9. A process for producing low molecular weight monohydric alcohol esters of high molecular weight fatty acids from glyceride oils, which comprises the steps of reacting said glyceride oil with an amount of a monohydric alcohol of from 1 to 3 carbon atoms equivalent to from 1.5 to about 4 times the theoretical amount required for complete alcoholysis of the glyceride oil, in the presence of from about 0.2% to about 1% (based on the weight of the alkaline earth base) by weight of the oil of the glycerine addition product of an alkaline earth base selected from the group consisting of strontium monoxide, calcium oxide, and calcium hydroxide, for a period of time of from about 10 minutes to about 8 hours at reflux temperature, neutralizing the excess alkalinity of the catalyst, and removing the unreacted alcohol and by-product glycerine from the reaction mass.

10. A process for producing low molecular weight monohydric alcohol esters of high molecular weight fatty acids from glyceride oils, which comprises the steps of reacting said glyceride oil with an amount of a monohydric alcohol of from 1 to 3 carbon atoms equivalent to from 1.5 to about 4 times the theoretical amount required for complete alcoholysis of the glyceride oil in the presence of from about 0.2% to about 1% (based on the weight of the alkaline earth base) by weight of the oil of the glycerine addition product of an alkaline earth base selected from the group consisting of calcium oxide, calcium hydroxide and strontium oxide for a period of time of from about 10 minutes to about 8 hours at reflux temperature, neutralizing the excess alkalinity of the catalyst with a non-mineral acidic material, and removing the unreacted alcohol and by-product glycerine from the reaction mass.

11. A process in accordance with claim 10 in which the non-mineral acidic material is the fatty acid corresponding to the glyceride being alcoholized.

12. A process in accordance with claim 2 in which the monohydric alcohol is methyl alcohol.

13. A process in accordance with claim 2 in which the glyceride oil is a vegetable oil.

14. A process in accordance with claim 2 in which the glyceride oil is soyabean oil.

15. A process in accordance with claim 2 in which the monohydric alcohol is methyl alcohol and the glyceride oil is soyabean oil.

16. A process in accordance with claim 2 in which the glycerine addition product is present in amounts ranging from .4% to .7% (based on the weight of the alkaline earth base) by weight of the oil.

17. A process in accordance with claim 2 in which the temperature is from 125° F to 180° F.

18. A process in accordance with claim 2 in which the temperature is about 160° F.

19. A process for producing methyl esters of soyabean oil fatty acids from soyabean oil, which comprises the steps of reacting said soyabean oil with 3 times the theoretical amount of methyl alcohol required to completely alcoholize said soyabean oil in the presence of about 0.4% to about 0.7% (based on the weight of calcium oxide) by weight of the oil of the glycerine addition product of 1 mol of calcium oxide per mol of glycerine for a period of about 4 hours at reflux temperature, neutralizing the excess alkalinity of the catalyst with soyabean fatty acids, and removing the unreacted methyl alcohol and by-product glycerine from the reaction mass.

20. A process for producing low molecular weight monohydric alcohol esters of high molecular weight fatty acids from glyceride oils, said esters being substantially free of metallic ions, which comprises the steps of reacting said glyceride oil with an amount of a monohydric alcohol of from 1 to 3 carbon atoms equivalent to from 1.5 to about 4 times the theoretical amount required for complete alcoholysis of the glyceride oil, in the presence of from about 0.2% to about 1% (based on the weight of the alkaline earth base) by weight of the oil of the glycerine addition product of an alkaline earth base selected from the group consisting of strontium monoxide, calcium oxide and calcium hydroxide, for a period of time of from about 10 minutes to about 8 hours at a temperature ranging from about 125° F. to about 190° F., neutralizing the excess alkalinity of the catalyst with a fatty acid corresponding to the acid radical of the glyceride initially used, removing the unreacted alcohol and by-product glycerine from the reaction mass, and thereafter treating the ester layer containing alkaline earth soaps with an excess of oxalic acid to precipitate the alkaline earth oxalate, and heating to decompose the unreacted oxalic acid.

21. A process for producing low molecular weight monohydric alcohol esters of high molecular weight fatty acids from glyceride oils, said esters being substantially free of metallic ions, which comprises the steps of reacting said glyceride oil with an amount of monohydric alcohol of from 1 to 3 carbon atoms equivalent to from 1.5 to about 4 times the theoretical amount required for complete alcoholysis of the glyceride oil, in the presence of from about 0.2% to about 1% (based on the weight of the alkaline earth base) by weight of the oil of the glycerine addition product of an alkaline earth base selected from the group consisting of strontium monoxide, calcium oxide, and calcium hydroxide, for a period of time from about 10 minutes to about 8 hours at a temperature ranging from about 125° F. to about 190° F., neutralizing the excess alkalinity of the catalyst with a fatty acid corresponding to the acid radical of the glyceride initially used, removing the unreacted alcohol and by-product glycerine from the reaction mass and thereafter treating the ester layer containing alkaline earth soaps with an acid selected from the group consisting of sulphuric, phosphoric, and oxalic to precipitate the alkaline earth salt, and removing the insoluble metal salts from the ester product.

JAMES V. HUNN.

References Cited in the file of this patent

UNITED STATES PATENTS

| Number | Name | Date |
|---|---|---|
| 2,383,580 | Arrowsmith | Aug. 28, 1945 |

FOREIGN PATENTS

| Number | Country | Date |
|---|---|---|
| 587,532 | Great Britain | 1947 |
| 606,711 | Great Britain | 1948 |